(12) United States Patent
Sinha

(10) Patent No.: US 6,970,474 B1
(45) Date of Patent: Nov. 29, 2005

(54) PERSONALIZED UNIVERSAL PHONE SERVICE

(75) Inventor: Atul N. Sinha, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 891 days.

(21) Appl. No.: 09/598,725

(22) Filed: Jun. 21, 2000

Related U.S. Application Data

(60) Provisional application No. 60/141,815, filed on Jul. 1, 1999.

(51) Int. Cl.[7] .............................................. H04L 12/28
(52) U.S. Cl. ...................... 370/401; 370/392; 370/352
(58) Field of Search ................................ 370/352–357, 370/389, 392, 401; 709/203, 216, 225, 227; 379/88.17, 219; 455/433

(56) References Cited

U.S. PATENT DOCUMENTS

| | | | | |
|---|---|---|---|---|
| 6,295,293 B1 * | 9/2001 | Tonnby et al. | ............... | 370/389 |
| 6,304,753 B1 * | 10/2001 | Hartmaier | ................... | 455/413 |
| 6,359,892 B1 * | 3/2002 | Szlam | ......................... | 370/401 |
| 6,496,867 B1 * | 12/2002 | Beser et al. | ................ | 709/245 |
| 6,560,216 B1 * | 5/2003 | McNiff et al. | .............. | 370/349 |

FOREIGN PATENT DOCUMENTS

| | | | | |
|---|---|---|---|---|
| WO | 98/11704 | 3/1998 | | |
| WO | 98/37665 | 8/1998 | | |
| WO | 99/05830 | 2/1999 | | |
| WO | 9707607 | 2/1999 | ........... | H04J 13/00 |

* cited by examiner

*Primary Examiner*—Duc Ho
(74) *Attorney, Agent, or Firm*—Dicran Halajian

(57) ABSTRACT

A gateway device couples a mobile telephone with a data network, such as the Internet, for voice communications. The gateway device is configured to provide a consistent interface with a user of the voice communications facility, independent of the method of user-access to the gateway device, and independent of the access to the data network. The gateway device allows for user-access from both wired and wireless telephone instruments, and provides the user a consistent service profile, independent of the location of the user at the time of access. The gateway device provides a service, such as a conventional "Voice over the Internet" (VoIP) application, that allows the user to place and receive telephone calls to other VoIP users, or to conventional telephone service users. In a preferred embodiment, the user may use a portable gateway device, such as a laptop or handheld computer, to gain access to the data network, or may use publicly available multiple-user gateway devices that are located at airports, hotels, train and bus stations, within transport vehicles such as airplanes, trains, buses, automobiles, and so on. Upon access, the user's service profile, including speed-dial numbers and the like, are provided to the user, via the gateway device currently being used.

9 Claims, 2 Drawing Sheets

PERSONALIZED UNIVERSAL PHONE SERVICE

This application claims the benefit of U.S. Provisional Application No. 60/141,815, filed Jul. 1, 1999.

BACKGROUND OF THE INVENTION

1. Field of the Invention

This invention relates to the field of communications, and in particular to wireless telephones and TCP/IP addressing 2. Description of Related Art The use of wireless telephones, such as cellular and satellite telephones, continues to increase. One of the difficulties with the use of cellular telephones is the incompatibility of telephones in different parts of the world. A telephone that is compatible with the cellular communications system in the United States, for example, would not be compatible with the cellular communications system in Europe. Satellite systems have been developed that use a common communications technique worldwide, but these systems are typically more expensive to deploy and maintain than conventional land-based systems.

One of the other difficulties with telephone systems, in general, is the variety of systems that are used to provide telephone communications. Cellular telephones are separate and distinct from conventional wired telephone systems such as those used in a home or office. The telephone system used in an office environment is often substantially different from a system used at home. This variety provides different capabilities for different applications, but also introduces the requirement to learn how to use the variety of capabilities. Often, for example, calls are inadvertently disconnected when a less experienced person attempts to forward a call to another party in an office environment. Often, an infrequent cellular telephone user forgets to press the "send" button, and waits idly for the call to go through.

The existence of the variety of different telephone communication systems can also make it more difficult to contact someone. An average person is typically associated with two or more different telephone numbers: a home phone number, an office phone number, a cellular phone number, a beeper phone number, and so on. Contacting the person often requires calling these different numbers until the person is reached. Similarly, each of these different telephone numbers will typically have an associated message recording capability, and to determine whether he or she has received a message, the person must contact each of the message recording means associated with the variety of telephone numbers.

In like manner, the person's "service profile" is created and maintained on each of the variety of services independently. If the person desires to use the same speed dial numbers on his or her cell phone, home phone, and office phone, for example, the telephone numbers and corresponding speed dial number must be entered into each system.

If a person changes one of his or her associated telephone numbers, as is often caused by a change of cellular service provider, the person must notify each of his or her acquaintances. Some of these acquaintances will then have to update their two or three speed dial lists. If the changed telephone number is associated with a business, the change will typically necessitate a reprinting of office stationary, business cards, and so on. These telephone-change induced problems often prevent the person from taking advantage of potentially more economical service plans, because the potential savings are offset by the ancillary costs and inconveniences caused by a telephone number change.

Cellular telephone systems have an additional disadvantage in that the service is specific to a particular telephone instrument. A very small cellular telephone instrument is convenient for travel, but may not be suitable for extended use in an office environment. Existing cellular systems, however, do not allow two different telephone instruments to be associated with the same telephone number. To gain the convenience of a small portable telephone instrument and a larger office telephone instrument, a person must incur the cost of two individual telephone accounts, and must incur the aforementioned inconveniences associated with multiple telephone numbers.

Application programs are available that allow telephone, facsimile, and videoconferencing via the Internet. Generally, this adds yet another number or identifier to the list of telephone numbers associated with an individual.

Some of the inconveniences of multiple telephone numbers may be overcome by using call-forwarding on select lines to forward all incoming calls to a single number, but there is often a cost associated with such a call-forwarding option.

BRIEF SUMMARY OF THE INVENTION

It is an object of this invention to provide a telephone service that can be used world-wide. It is a further object of this invention to provide a consistent telephone interface regardless of the provider of the telephone service.

These objects and others are achieved by providing a gateway device that couples a mobile telephone with a data network, such as the Internet, for voice communications. The gateway device is configured to provide a consistent interface with a user of the voice communications facility, independent of the method of user-access to the gateway device, and independent of the access to the data network. The gateway device allows for user-access from both wired and wireless telephone instruments, and provides the user a consistent service profile, independent of the location of the user at the time of access. The gateway device provides a service, such as a conventional "Voice over the Internet" (VoIP) application, that allows the user to place and receive telephone calls to other VoIP users, or to conventional telephone service users. In a preferred embodiment, the user may use a portable gateway device, such as a laptop or handheld computer, to gain access to the data network, or may use publicly available multiple-user gateway devices that are located at airports, hotels, train and bus stations, within transport vehicles such as airplanes, trains, buses, automobiles, and so on. Upon access, the user's service profile, including speed-dial numbers and the like, are provided to the user, via the gateway device currently being used.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE INVENTION

Figure 1:
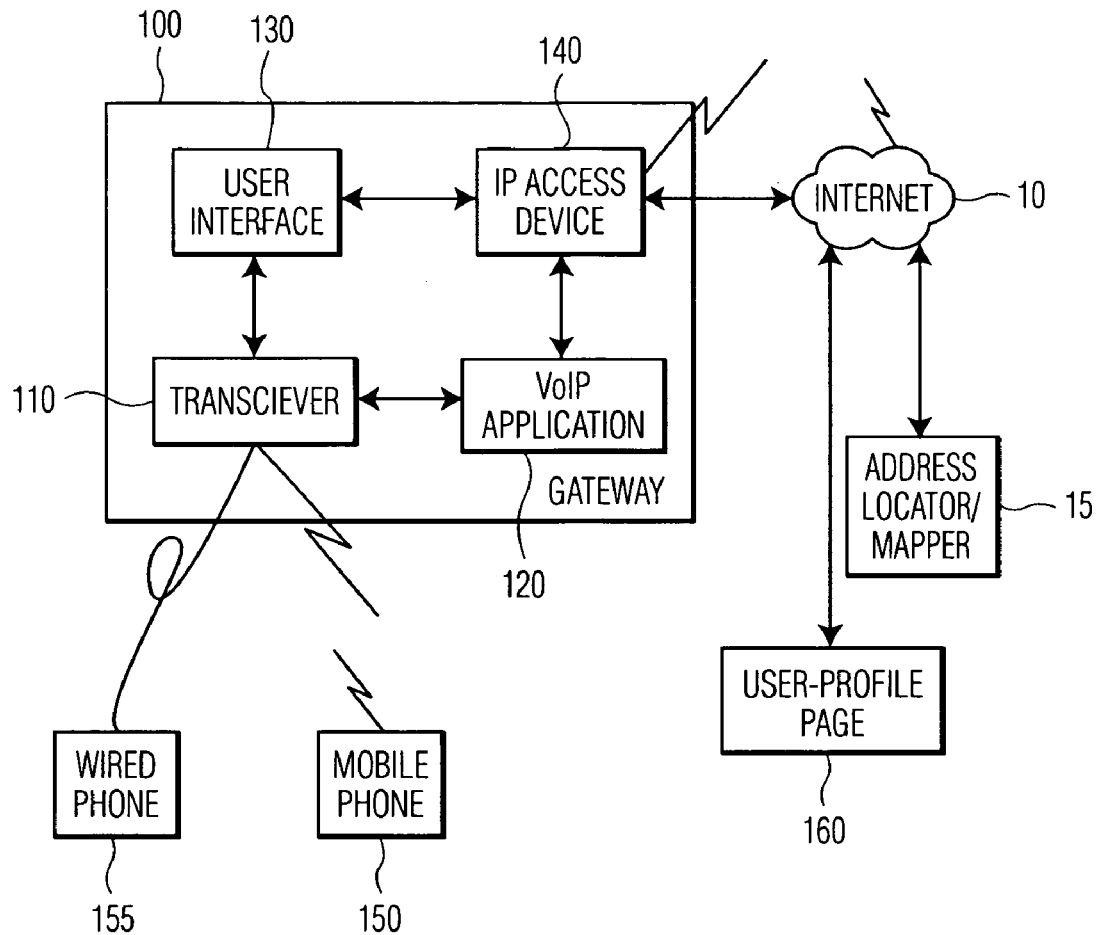
FIG. 1 illustrates an example block diagram of a gateway device in accordance with this invention.

The invention addresses offering a user a phone service, which he/she can access from anywhere and at anytime in the world through a single personalized device (phone). The characteristics of this service include a universal phone service while traveling, at a conference, at work, at home, etc.; access to the service through a single wireless device, i.e., no need to use a plurality of phone devices; a single access identifier, e.g., phone number; a single personalized service profile: mailbox, call filters, synchronization with calendar, etc.

This invention is based on the observation that many of the above mentioned problems with telephony have been solved, within another context, on Internet Protocol (IP) based networks, Intranets and Internet for data services. There is a standard IP-based infrastructure all over the world that also scales to the consumer level. A user can access a single service through a single user interface all over the world. Moreover, a user can have a single access identifier, email address, with which he/she can send and receive emails, regardless of his/her geographic location. Further, a user can have a single service profile, anywhere.

This invention solves the above problems within the context of telephony by offering the phone service on IP based network with the same service provisioning concepts and allowing a user to access the service through a single mobile phone device from all over the world. This requires a gateway to interconnect the mobile device with the IP-based fixed network. A call from a first phone device to a second phone device traverses a first gateway to the IP network and a second gateway from the IP network to the second phone device. A directory server and a profile server are available on the IP network. An implementation model for such a service uses, for example, a wireless link between the phone and the gateway, such as provided by the evolving Bluetooth standard indoors and the evolving UMTS standard outdoors, or on any other method.

An evolutionary scenario for arriving at a wireless infrastructure is described below by way of example. The first phase in the evolution scenario is to allow a user of a wireless phone to access the phone service outside the roaming range of the respective mobile service. This is typically needed when the user is traveling. A simple solution is provided by a wireless link access from a mobile phone device to a gateway on the IP network, and via a multi-call gateway component from the IP network to a conventional mobile phone service network. In this scenario the gateway between the phone device and the IP network includes, for example, a PC with the respective hardware and software functionalities. A business traveler typically has a PC, which can be equipped with the gateway. Also in this phase, the wireless access link could be implemented with the outdoors wireless link method with reduced transmission power for very short distances (few meters). In the next evolutionary phase, the gateway could be installed in public places most visited by business travelers, such as airports, hotels, conference facilities, and so on. In this phase, a universal standard indoors wireless access method, such as Bluetooth, would be particularly well suited. In subsequent phases, the above gateway could also be installed at the work place and then at home as well.

Generally, computer communication systems using an IP or similar networking protocol can be configured to provide data to each connected IP address, independent of the physical location of the device associated with the IP address. A business traveler can, for example, access the Internet to retrieve his or her e-mail, regardless of where the traveler happens to be located. The same computer device and user interface that the traveler uses in the United States can be used to access the Internet in Europe. The traveler can use a small laptop or palmtop device to access e-mail while traveling, and a larger desktop device to access e-mail while at the office, and a web-TV device to access e-mail at home. Services are available that allows the same e-mail address to be used regardless of the provider of the Internet access service. The user interface with the Internet can also be provided independent of the provider of the Internet access service. The user can configure a browser or e-mail program to access different service providers, depending upon location, yet the interface to the browser or e-mail program remains the same. In like manner, the user's Internet interface can be located at a globally accessible site within the data network, so that this same interface can be accessed by the user, regardless of the device used to access the Internet.

The same globally accessible common user interface, and common service profile, can be provided to telephone users by coupling the telephone instruments typically used by a user, and in particular, mobile telephone instruments, into a data network that facilitates such a globally accessible interface. FIG. 1 illustrates an example block diagram of a gateway device 100 that provides access to a data network, exemplified by the Internet 10, for at least voice communications. The example gateway 100 includes a transceiver 110 and a conventional "voice over IP" (VoIP) application 120 that facilitates voice communications over an IP data network 10 via an IP access device 140, such as a modem. In accordance with this invention, the transceiver 110 is configured to provide access to the VoIP application 120 from a mobile telephone instrument 150. In a preferred embodiment, the transceiver 110, or another transceiver, also provides access to the VoIP application 120 from a wired telephone instrument as well. For ease of reference, the term "mobile telephone" is used herein to refer to conventional cellular or satellite communication systems, and corresponding telephone instruments that do not, per se, have a "fixed" location. "Wired telephone", on the other hand, refers to telephone systems that provide service to fixed locations, typically via wires or cables; wireless telephones that communicate to such systems via a base station at the fixed location are included herein as "wired" telephone instruments. Also for ease of reference, a "telephone instrument" is defined herein as any device or combination of devices that are capable of transforming voice input into electrical signals and incoming electrical signals into an audible output.

As is known in the art, a VoIP application 120 transmits and receives telephone calls using IP addresses. The IP address may be static or dynamic. Some devices at fixed locations have IP addresses that do not change (static addresses), whereas devices at other locations (fixed and mobile) have IP addresses that are dynamically determined when the device accesses the network. Generally, a particular user of an application, such as VoIP 120 is associated with a unique "application name", similar to a user of an e-mail application having a unique "e-mail name". For ease of reference, a user's application name for a VoIP application is herein referred to as the user's voip-name. When the user accesses the network 10, an address locator 15 associates the user's voip-name to the particular IP address corresponding to the IP access device 140. The address locator 15 also associates a unique session identifier corresponding to this voip-name at this IP address, because the IP access device 140 may have more than one application concurrently accessing the network 10. As is common in the art, once an application name is assigned to a particular session identifier and IP address, other applications are able to determine the assignment, and thereby communicate with the VoIP application 120.

Conventionally, a VoIP application 120 uses the audio capabilities of the computer upon which it is running, or a wired telephone instrument 155 that is attached to the computer, to receive and transmit the audio information from and to the user. The conventional VoIP application provides features to the user via a user interface 130 that includes, for example, speed-dialing, voice-directed-dialing, address book, directory of commonly called numbers, and so on, hereinafter termed a user-profile. As discussed above, a typical VoIP installation adds yet another "telephone number" (in this case an IP address) to the multitude of numbers associated with a typical user.

In accordance with this invention, however, the transceiver 110 is configured to interact with the mobile telephone 150 in the same manner as a cellular or satellite system interacts with a mobile telephone, thereby providing an access mode that is "transparent" to the user, and, when adopted by service providers, will be "transparent" to a person calling the user using the user's mobile telephone number. The invention is presented hereinafter as a two-phase embodiment of capabilities. In the first phase, the user is provided access to a data network from a mobile telephone for initiating telephone calls from the mobile telephone, and for receiving telephone calls placed to the user's voip-name, via for example, another VoIP application. In the second phase, public telephone providers route calls placed to a conventional telephone number to a voip-name corresponding to that telephone number. The first phase provides a number of advantages to a user, independent of whether or when the second phase is implemented, as discussed below.

Consider the installation of gateway 100 in a user's office computer and home computer. In a preferred embodiment, the user-profile is located at a user-profile page 160 on the data network 10, so that it can be accessed from either the user's office computer or home computer as required. When the user is within range of the office computer or the home computer, the mobile phone 150 provides identical features and capabilities to the user, regardless of the particular location (home or office) of the user. New contact telephone numbers that are added to the user-profile, for example, are subsequently available to the user at either location, and the same options are provided to the user at either location. In a preferred embodiment, the user-profile page may be partitioned by the user into sub-profiles, to facilitate the organization of the information contained in the page, yet each sub-profile is available for use from either location, as required.

Consider now the installation of the gateway 100 in a user's portable computer. Whenever the portable computer is provided access to the data network 10, the user can use the mobile phone 150 to place calls via the data network 10, using an identical interface, and having access to the same user-profile, as in the user's home or office. Note that this capability extends to overseas locations, because, unlike telephone protocols and standards, the IP protocol is independent of national boundaries. A user traveling to Europe, for example, can use his or her US-compatible mobile telephone, via an access to the data network 10 from the user's portable computer.

Note that the user-dependent information in a preferred embodiment is located on the user-profile page 160, or within the mobile phone 150. Therefore, the gateway 100 is user-independent, and need not be directly associated with a particular user. In an office environment, for example, the gateway 100 may be located at a central server, and contain multiple transceivers 110 to service simultaneous users. Such multi-user gateways 100 may also be located in public areas, such as airports and train or bus stations, hotels, within trains, buses, and planes, and so on. Whenever a user is within the vicinity of such a gateway 100, the user will be provided the same interface, and the same set of user-dependent and user-independent features and options.

To effect this first phase, the mobile telephone 150 is configured to recognize when it is in the vicinity of a gateway 100. Mobile telephones are currently available that include a variety of communication capabilities, such as digital or analog cellular capabilities, local "walkie-talkie" capabilities, and the like. In phase one of the embodiment of this invention, an additional communication capability can be added to the mobile telephone 150, and the mobile telephone 150 can be configured to automatically switch to this additional communication whenever it detects the presence of a gateway 100. The same techniques used to select a digital mode over analog mode whenever the mobile telephone 150 detects the presence of a digital-compatible cell in a cellular system can be used to effect this automatic switch, giving overall selection preference to communications with the gateway 100. Preferably, the transceiver 110 uses the same communication protocol as that provided by the cellular or satellite service provider, and automatically "captures" the mobile phone 150 when a call is initiated in its vicinity. For example, in a conventional cellular system, the mobile phone 150 initially issues a channel request. The cell(s) within range of the mobile phone 150 respond with a channel allocation, typically by assigning the mobile phone 150 a particular CDMA code and time-slot allocation. When the mobile phone 150 responds with that CDMA code in the appropriate time-slot, communication is established. The mobile phone 150 responds to only one cell; cells that do not receive a response using their allocated CDMA code and time-slot are configured to deallocate the code and time-slot, for subsequent allocation to another mobile phone 150. In a preferred embodiment, the transceiver 110 communicates the appropriate response to the request by the mobile telephone 150, and that response serves to notify the mobile telephone 150 that it is in the vicinity of the gateway 100. In this preferred embodiment, the initial communication by the mobile telephone 150 may be, for example, a "send" request without a corresponding telephone number, that instructs any gateway 100 within its vicinity to respond.

The gateway 100 preferably transmits a periodic pilot signal, to which the mobile telephone 150 responds, regardless of whether a new call is being placed. In this manner, the gateway 100 can become aware that a recipient exists for messages that are addressed to the user's voip-name, and can effect the appropriate mapping of the voip-name to its IP address, thereby allowing incoming messages to this voip-name to be received. Note that, in accordance with this invention, multiple telephone instruments 150, 155, etc. can be assigned the same user voip-name. Messages addressed to the voip-name will be routed to whichever instrument 150, 155 "answers first", similar to "rollover" telephone exchanges, or to conventional e-mail servers.

When communication is commenced by the mobile telephone 150, via the dedicated communication capability, or via conventional mobile communications on a channel allocated by the gateway 100, the gateway 100 provides the features of the user interface 130 to the connected telephone 150, including the features and data associated with the user-profile page 160, as discussed above.

Figure 2:
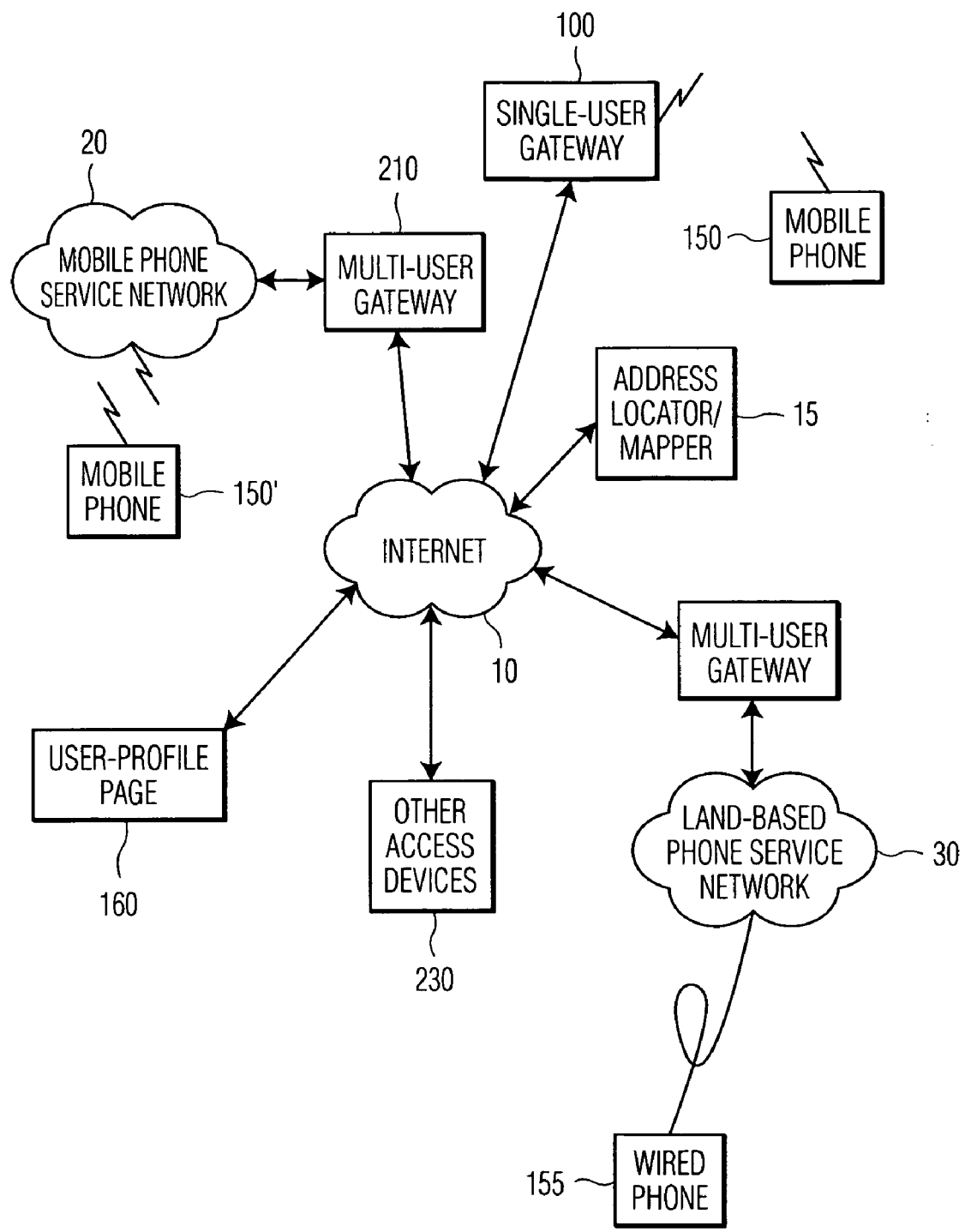
FIG. 2 illustrates an example block diagram of a communications system that uses gateway devices in accordance with this invention.

FIG. 2 illustrates an example block diagram of a communications system 200 in accordance with the second phase of this invention. In this phase, the public telephone providers are integrally coupled to the data network 10 via a multi-user gateway 210. A mobile telephone 150' is illustrated in FIG. 2 as being coupled to a mobile telephone service network 20, presumably being out of range of a local gateway 100. The gateway 210, being connected to the data network 10, has access to the user-profile page 160. In accordance with this aspect of the invention, the gateway 210 is configured to provide the user of the mobile telephone 150', via the mobile telephone service network 20, the same interface that the user is provided when the mobile telephone 150' is in the vicinity of a local gateway 100. In like manner, the gateway 210 is used to couple the land-based telephone service network 30 to the data network 10. In this manner, the user can be provided the same interface when the user uses a wired telephone 155. In a preferred embodiment, particular telephone instruments 155, or particular locales of telephone instruments, such as the user's home, may be pre-associated with the user, so that the user is provided immediate access to the interface and user-dependent information whenever the associated instrument 155 is used. Additionally, a user may dial into the land-based telephone service network 30, or the mobile telephone service network 20, from an arbitrary telephone instrument and provide the voip-name, or another identifier of this user and/or this user's voip-name. Thereafter, the telephone service network 20, 30 provides the user with the user interface associated with the voip-name, based on the particular user-profile 160.

The configuration of FIG. 2 also allows the telephone service network 20, 30 to route incoming calls to corresponding IP addresses that are associated with voip-names. Using the same techniques that are commonly used by cellular telephone providers to locate a particular mobile telephone, and techniques that are commonly used to determine the presence of a particular user on the Internet, the networks 20, 30 are configured to locate a currently accessible instrument that is associated with an incoming destination telephone number. This search for an accessible instrument includes a search of the data network for an instrument that is associated with the IP address that corresponds to a voip-name associated with the destination telephone number. The telephone connection is made to the first instrument that responds to the search request. If a currently accessible telephone instrument is not located, a "please-leave-a-message" response is provided to the calling party, preferably based on the user-profile page 160. In a preferred embodiment, a user may have a personal phone number and a business phone number, and the user-profile page 160 is configured to provide a different response message based upon which phone number was called. In a preferred embodiment, the corresponding voice-mail messages are also stored on the data network 10, and are thereby accessible by the user from any gateway 100, 210, or other access device 230.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

I claim:

1. A gateway device comprising:
   a communication device that is configured to communicate with a mobile telephone and with multiple telephones,
   a network access device that is configured to communicate with a data network, to provide thereby communications with the mobile telephone as identified by a user-specific VoIP-name via the data network, and to provide the communications with the mobile telephone and the multiple telephones based on an IP addressing scheme, and
   a user interface application that is configured to provide a user-dependent interface to a user of each telephone of the multiple telephones, based on a user-profile of each user of the multiple telephones, the user-profile of each user being accessible via the data network.

2. The gateway device of claim 1, wherein the data network includes an Internet network.

3. The gateway device of claim 1, further including
   an interface application that is configured to facilitate a connection between the mobile telephone and another telephone instrument via an IP address that is associated with the other telephone instrument.

4. The gateway device of claim 1, further including
   an interface application that is configured to facilitate a connection between the mobile telephone and another telephone instrument via an IP address that is associated with the mobile telephone.

5. A method for using a voice communication device on a data network, comprising:
   providing a gateway for interfacing a voice communications network with the data network;
   providing a user with a unique VoIP-name;
   providing a profile page on the data network, the profile page being associated with the VoIP-name, the profile page comprising user-specific information;
   accessing the profile page using the voice communications device, the voice communications device having an IP address; and
   temporarily associating the VoIP-name with the IP address.

6. The method of claim 5, further including
   enabling access to the gateway for interfacing with a wired telephone, and
   wherein
   the profile page facilitates enabling the user to communicate from either the mobile telephone or the wired telephone using a common interface that is based on the profile page.

7. The method of claim 5, further including
   enabling access between the gateway and a public telephone network via the data network.

8. The method of claim 5, further comprising:
   enabling access between the gateway and a public telephone network via the data network; and
   initiating said voice communication by the public telephone network in response to a telephone call to a telephone number that is associated with the user.

9. A communication system for using a voice communication device on a data network, comprising:
   means for providing a gateway for interfacing a voice communications network with the data network;
   means for providing a user with a unique VoIP-name;
   means for providing a profile page on the data network, the profile page being associated with the VoIP-name, the profile page comprising user-specific information;
   means for accessing the profile page using the voice communications device, the voice communications device having an IP address; and
   means for temporarily associating the VoIP-name with the IP address.

* * * * *